Nov. 11, 1947.　　J. W. DEVORSS, JR　　2,430,709
RESILIENT MOUNTING
Filed Sept. 2, 1942　　2 Sheets-Sheet 1

INVENTOR.
JOSEPH W. DEVORSS, JR.
BY
ATTORNEY

Nov. 11, 1947.  J. W. DEVORSS, JR  2,430,709
RESILIENT MOUNTING
Filed Sept. 2, 1942   2 Sheets-Sheet 2
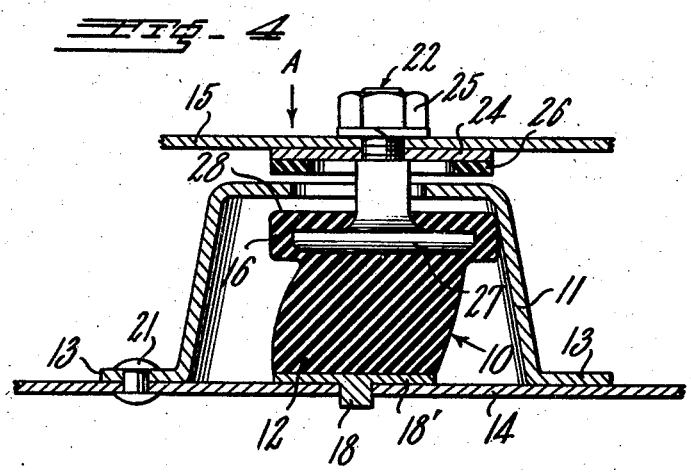
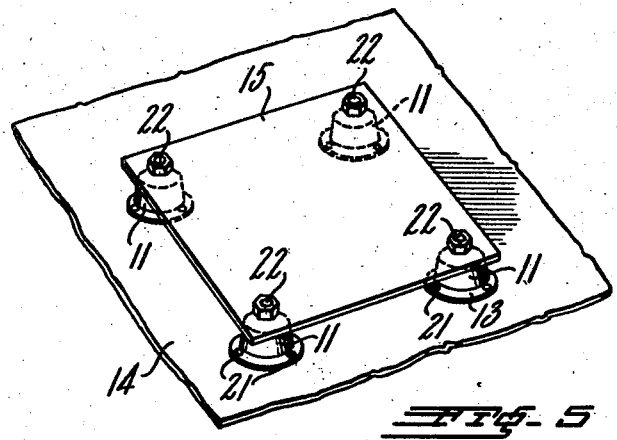
INVENTOR.
JOSEPH W. DEVORSS, JR.
BY
ATTORNEY Patented Nov. 11, 1947

2,430,709

UNITED STATES PATENT OFFICE 2,430,709

RESILIENT MOUNTING

Joseph W. Devorss, Jr., Scarsdale, N. Y., assignor to United States Rubber Company, New York, N. Y., a corporation of New Jersey Application September 2, 1942, Serial No. 457,013

4 Claims. (Cl. 248—358)

This invention relates to an improved resilient mounting for absorbing vibrations or vibratory movements of a supported member which may be carried thereby, or for absorbing vibrations that may be transmitted from the supporting to the supported member. The invention relates particularly to such a mounting comprising a column of relatively soft resilient rubber carried at one end by a supporting member and whose other end is free to move in all directions over a limited range without making contact with any supporting members when the rubber is loaded in compression by the supported member.

The term "loaded in compression" is used herein to mean that the rubber is stressed by the tendency of the load to compress the rubber between the supported and supporting members. The stresses and strains produced in the rubber as a result of the load acting thereon in such manner are referred to as compressive stresses and strains. The word "rubber" as used herein shall mean soft resilient elastic rubber, either natural or synthetic.

In the design of resilient rubber mountings it is desirable for safety precautions and for the economical use of the rubber that it be loaded in compression in the direction of the major force exerted thereon by the supported or vibrating member. Heretofore, resilient rubber mountings so loaded failed to efficiently absorb vibrations in all directions because their natural frequency of vibration was increased by unduly restricting the flow or movement of the rubber when subjected to vibrations in certain directions.

In accordance with the present invention resilient mountings having rubber loaded in compression are rendered more resilient and the desired vibration absorbing characteristics are obtained by supporting a column of soft resilient rubber at one end and permitting it to expand freely in directions transverse to the direction of application of the load applied at its opposite end by the supported member, and at the same time permitting the free transverse movements of the supported member within a limited range of movement without any substantial restriction by any supporting member. By this design a low natural frequency of vibration in all directions is obtained and therefore the vibrations are absorbed more efficiently. The mounting also has the advantageous safety feature of limiting the excessive movements of the supported member in all directions.

The invention is further described in the following description, and an embodiment is illustrated in the accompanying drawings in which:

Fig. 4 is a cross-sectional view of the mounting shown in its loaded position and also vibrated to an extreme lateral position; and Fig. 5 is an isometric top view of a supported member carried by a plurality of mountings.

Figure 1:
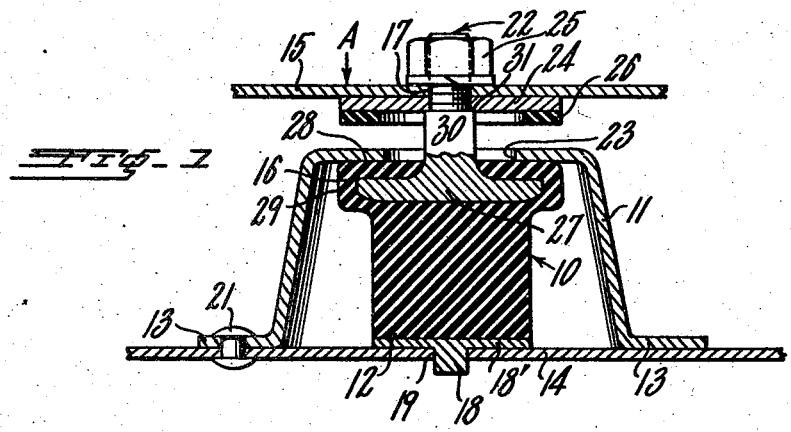
Fig. 1 is a cross-sectional view of the resilient mounting embodying the invention, in which the mounting is shown in an unloaded position or at its outer limit of vibration.
Figure 2:
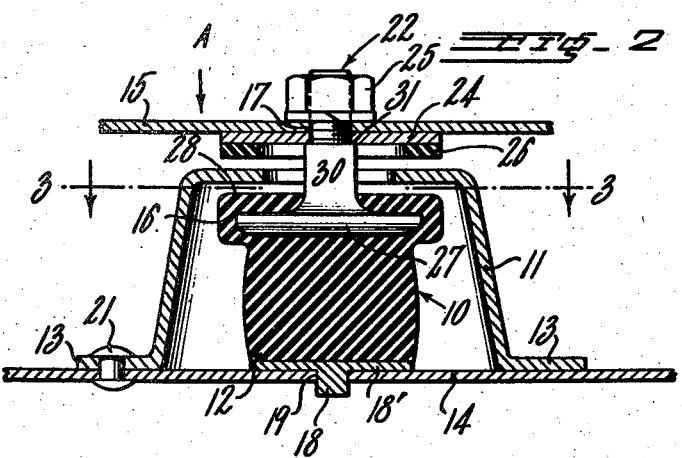
Fig. 2 is a cross-sectional view of the mounting shown in Fig. 1, but illustrated in a loaded position.

As shown in the drawings, the mounting comprises a soft resilient column of rubber 10 enclosed in an outer housing 11. The base or bottom end 12 of the rubber column 10 and the base 13 of the housing 11 are supported on a supporting member 14. The load is applied in the direction of the arrow A by a supported member 15 to the top 16 of the column of rubber. When the load is applied and the member 15 is not vibrating, it and the rubber column assume the position shown in Fig. 2, and when the supported member 15 vibrates to its upper limit of movement it assumes the position shown in Fig. 1. The base 12 of rubber 10 is centered in the housing 11 by a projection 18, which is secured to the rubber, and extends into an opening 19 in the supporting member 14. Preferably the projection 18 is formed on a metal plate 18' which is bonded to the base 12 of the column of rubber 10. The bond may be formed by vulcanizing the rubber to the metal 18'. The housing base 13 is secured to the supporting member 14 by rivets 21, or the like.

The supported member 15 is connected to the top or free end 16 of the rubber column 10 by a metal projection 22 extending from the rubber 10 through an opening 17 in the member 15 and an opening 23 in the top of the housing 11. The supported member 15 is secured to the projection 22 between a disc 24 and a nut 25. The disc 24 carries a rubber bumper ring 26, which is adapted to contact the housing 11 in its downward movement.

Figure 3:
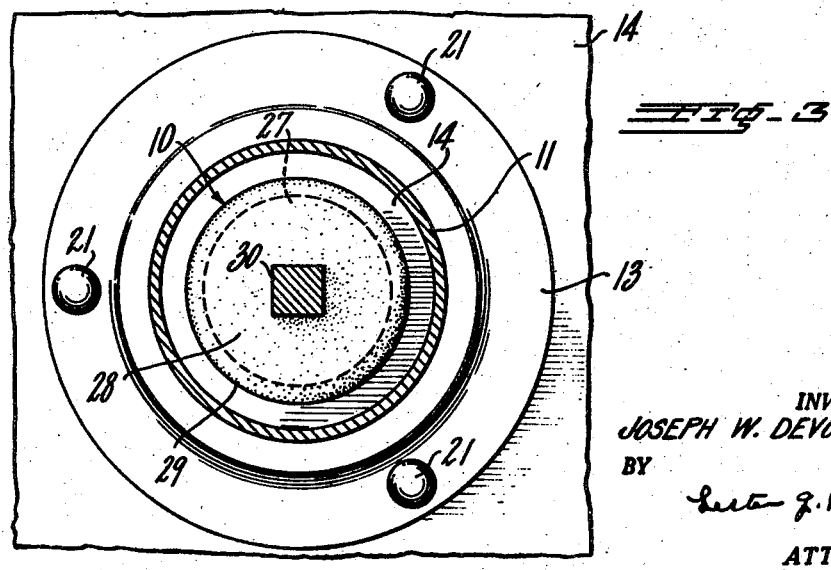
Fig. 3 is a plan view of the mounting, shown partly in section taken on line 3—3 in Fig. 2.

The projection 22 is provided with a base 27 which is embedded in the upper end 16 of the rubber column 10, so as to provide an upper rubber bumper surface 28 and a peripheral rubber bumper surface 29. The projection 22 is provided with a squared shank 30 (Fig. 3), for the purpose of holding the shank against rotation while the nut 25 is screwed down tightly upon the supported member 15 so as to clamp it and the disc 20 to the projection 22 between its shoulder 31 and the nut 25.

In assembling the mounting, the rubber column 10 is placed on the supporting member 14 so that the projection 18 extends through the opening 19 in the member 14. The housing 11 is then placed over the rubber column 10 so that the projection 22 extends through the opening 23 in the housing 11. Before the rubber column 10 is enclosed in the housing, its over-all length between its upper surface 28 and the bottom surface of the base 12 is greater than the inside height dimension of the housing 11. Consequently the top of the housing strikes the surface 28 before the base 13 of the housing makes contact with the supporting member 14. When the base 13 of the housing makes contact with the supporting member 14, the rubber column 10 is initially loaded in compression, by the downward movement of the top of the housing 11 against the top surface 28 of the rubber column 10. The rubber 10 being so loaded the projection 18 cannot jump out of the opening in the supporting member 14. The base 13 of the housing 11 is secured in that position to the supporting member 12 by the rivets 21. The bumper disc 24 is then placed on the shoulder 31 of the shank 30, and the supported member 15 is placed on the disc 24 with the opening 17 surrounding the projection 22. The nut 25 is then screwed down on the supported member 15.

In the operation of the mounting, the load is applied in the direction of the arrow A by the supported member 15. The normal load of the supported member 15 moves the top surface 28 of the column 10 to the position shown in Fig. 2 so that it is held out of contact with the top of the housing 11. The mounting normally remains in such position when it is not subject to vibration, and as the free end 16 of the column of rubber does not make any contact with any supporting member, it is free to move in all directions within the limits of the housing 11 without restriction, other than that offered by the column of rubber 10.

The supported member 15 therefore can vibrate in all directions. The normal vibrations of the supported member 15 within predetermined limits are absorbed by the rubber column 10 without the rubber surfaces 26, 28 and 29 coming in contact with the opposed surfaces of the housing 11. The normal vibration of the member 15 toward the supporting member 14 is absorbed by imparting compressive stresses to the rubber column 10 and the lateral vibrations are absorbed by the resistance of the rubber to lateral movement. Any excessive movement of the supported member 15 away from the supporting member 14 is limited by the contact of the surface 28 with the top of the housing 11. The downward vibratory movement of the supported member 15 is limited by the rubber bumper ring 26 making contact with the top surface of the housing 11, and the transverse vibratory movements are limited by the contact of the peripheral rubber surfaces 29 with the side-walls of the housing.

When the supported member moves or vibrates in directions parallel to the supporting member 14, as shown in Fig. 4, shearing stresses are imparted to the rubber 10 by virtue of the head 27 of the projection 22 being bonded to the top end 16 of the column of rubber 10 and the plate 18' being bonded to the base 12, and the head 27 being caused to move laterally and parallel to the plate 18'. However, the head 27 may be caused to wobble in respect to the plate 18' by vibrations which are inclined to the plane of the head 27 and the plate 18' and impart flexing stresses to the rubber. In either case the rubber is free to move in all directions, except at its base 12, where it is supported. The unrestricted movement of the rubber in all directions above its base, excepting for the internal compressive, shearing, and flexing stresses imparted thereto, gives the mounting a lower natural frequency of vibration in all directions than if the flow of the rubber was otherwise restricted by a supporting surface. Due to this lower natural frequency, a more efficient vibration absorbing mounting is produced.

The parallel movement of the head 27 with respect to the plate 18' will be obtained when the stem 22 is prevented from wobbling with respect to the plate 18'; as in the case where at least three mountings are used to support the supported member 15 and the projections 22 are rigidly connected to a rigid member or base for the supporting member as illustrated in Fig. 5, and the direction of the vibratory movements of the member 15 are parallel to the plane of its surface. However, the head 27 may be caused to wobble to some extent, if unbalanced forces act on the supported member 15 in a direction perpendicular to its surface, or the head 27.

The opening 23 in the top of the housing 11 is made sufficiently large to permit the peripheral surfaces 29 to contact with the side-walls of the housing 11 before the shank 30 of the projection 22 strikes the edges of the opening 23 in the housing 11. If desired, however, the shank 30 may be covered with rubber, and the opening 23 may be made sufficiently small so that the rubber will strike the edges of the opening and cushion the lateral vibrations of the shank. Since all of the bumper surfaces are made of soft resilient rubber the excessive movements of the supported member 15 are resiliently cushioned.

While the preferred form of this invention has been described in detail, it will be understood that changes therein may be made without departing from the spirit of the invention, or the scope of the appended claims, and it is desired to cover the invention as broadly as permitted by the prior art.

Having thus described my invention, what I claim and desire to protect by Letters Patent is:

1. A resilient mounting comprising a column of rubber having a rigid plate of substantial area bonded to the base of said rubber column and carried by a supporting member; means for anchoring said base of said column to said supporting member; a housing surrounding said column of rubber; said housing having a top wall, side walls, and a base anchored to said supporting member; said top wall having an opening therein; a rigid projection secured to the end of said column opposite its base and extending through said opening in said top wall for connecting said rubber column to a supported member; said projection being normally spaced from the edges of said opening when loaded and being adapted to vibrate in all directions within limits without making contact with said edges; said projection having a head thereon of substantial area extending substantially parallel to said plate and embedded in the end of said rubber column opposite its base; said end of said rubber column having rubber bumper surfaces adapted to contact with the top and side walls of said housing at the end of excessive vibratory movements, but at all other times being out of contact with the top and side walls of said housing when said column is loaded.

2. A resilient mounting in its non-vibrating loaded position comprising a column of rubber stressed in compression by the load, said column having one of its ends secured to one object and its other end secured to another object, a housing having top and side walls surrounding said column and secured to said first object, said housing having an aperture in its top wall, means connected to the second end of said column and extending through and spaced from the walls of said aperture, said means being adapted to be connected to said second object and to support same on said column of rubber, said second end of said column of rubber being larger than said aperture and when loaded being normally retained out of contact with said housing, said second end of said column of rubber when loaded being normally spaced from said housing and freely movable in respect thereto through a limited range of vibration in all directions while out of contact with said housing, and said second end of said column of rubber being adapted to contact the apertured wall and sidewalls of said housing at the end of the excessive vibratory movements to cushion and limit same.

3. A resilient mounting in its non-vibrating loaded position comprising a column of rubber stressed in compression by the load, said column having one of its ends secured to one object and its other end secured to another object, a housing having top and side walls surrounding said column and secured to said first object, said housing having an aperture in its top wall, means for connecting said column to said second object including a metallic stem having a head thereon larger than said aperture, said head being embedded in said second end of said column, said stem extending through and spaced from the walls of said aperture, said second end of said column of rubber when loaded being normally spaced from said housing and freely movable in respect thereto through a limited range of vibration in all directions while out of contact with said housing, and said second end of said column of rubber being adapted to contact the apertured wall and sidewalls of said housing at the end of the excessive vibratory movements to cushion and limit same.

4. A resilient mounting in its non-vibrating loaded position comprising a column of rubber stressed in compression by the load exerted by one object upon another object supported in respect thereto, a housing having an end and side walls enclosing said column of rubber and connected to the first object, said housing having an aperture in its end wall opposite one end of said column, means supported by said end of said column and extending through and spaced from the walls of said aperture, said means being adapted to be fixed to said second object, said means having a rubber covered portion positioned within said housing, said rubber covered portion within said housing being larger than said aperture and being normally retained out of contact with said housing by said load and being freely movable in respect to said housing through a limited range of vibration in all directions when so loaded, and said rubber covered portion being adapted to contact said housing at the end of the excessive vibratory movements to cushion and limit said movements.

JOSEPH W. DEVORSS, JR.

REFERENCES CITED

The following references are of record in the file of this patent:

UNITED STATES PATENTS

| Number | Name | Date |
| --- | --- | --- |
| 1,622,713 | Gillespie | Mar. 29, 1927 |
| 1,876,704 | Lipcot | Sept. 13, 1932 |
| 1,920,436 | Riker | Aug. 1, 1933 |
| 2,041,353 | Kenney et al. | May 19, 1936 |
| 2,079,798 | Geyer | May 11, 1937 |
| 2,175,405 | Meredith et al. | Oct. 10, 1939 |

FOREIGN PATENTS

| Number | Country | Date |
| --- | --- | --- |
| 782,089 | France | May 27, 1935 |
| 797,652 | France | Feb. 17, 1936 |